(12) United States Patent
Nath et al.

(10) Patent No.: US 7,937,449 B1
(45) Date of Patent: May 3, 2011

(54) SYSTEM AND METHOD FOR ENABLING NETWORK STACK PROCESSES IN USER MODE AND KERNEL MODE TO ACCESS KERNEL MEMORY LOCATIONS

(75) Inventors: Anuj Nath, Stoneham, MA (US); Tibor F. Ivanyi, Pelham, NH (US); William D. Alexander, Arlington, MA (US)

(73) Assignee: Empirix, Inc., Bedford, MA (US)

( * ) Notice: Subject to any disclaimer, the term of this patent is extended or adjusted under 35 U.S.C. 154(b) by 210 days.

(21) Appl. No.: 12/246,742

(22) Filed: Oct. 7, 2008

Related U.S. Application Data (60) Provisional application No. 60/978,210, filed on Oct. 8, 2007.

(51) Int. Cl.
*G06F 12/00* (2006.01)
(52) U.S. Cl. ............... 709/213; 726/15; 711/1; 711/100
(58) Field of Classification Search .................. 709/213; 726/26; 711/1, 100
See application file for complete search history.

(56) References Cited

U.S. PATENT DOCUMENTS

| | | | | |
|---|---|---|---|---|
| 5,778,226 A * | 7/1998 | Adams et al. | ................. | 719/311 |
| 5,815,707 A * | 9/1998 | Krause et al. | ................. | 719/321 |
| 6,032,179 A * | 2/2000 | Osborne | ....................... | 709/213 |
| 6,438,591 B1 * | 8/2002 | Fehskens et al. | ............. | 709/223 |
| 6,675,218 B1 * | 1/2004 | Mahler et al. | ................. | 709/230 |
| 6,826,615 B2 * | 11/2004 | Barrall et al. | ................. | 709/227 |
| 6,892,287 B1 * | 5/2005 | Millard et al. | ................. | 711/158 |
| 7,210,009 B2 * | 4/2007 | Gulick et al. | ................. | 711/159 |
| 7,603,484 B2 * | 10/2009 | Dai et al. | .......................... | 710/5 |
| 7,784,063 B2 * | 8/2010 | Worley et al. | ................. | 719/319 |
| 2002/0133678 A1 * | 9/2002 | Mathews et al. | ............. | 711/153 |
| 2003/0101324 A1 * | 5/2003 | Herr et al. | ....................... | 711/170 |
| 2003/0188227 A1 * | 10/2003 | Maison et al. | .................. | 714/42 |
| 2005/0138242 A1 * | 6/2005 | Pope et al. | ........................ | 710/48 |
| 2006/0173970 A1 * | 8/2006 | Pope et al. | ..................... | 709/216 |
| 2007/0174511 A1 * | 7/2007 | Yu et al. | .......................... | 710/36 |
| 2007/0223483 A1 * | 9/2007 | Huang et al. | .................. | 370/394 |
| 2007/0294496 A1 * | 12/2007 | Goss et al. | ..................... | 711/163 |
| 2008/0040800 A1 * | 2/2008 | Park | ............................... | 726/22 |
| 2008/0077800 A1 * | 3/2008 | Wang et al. | ................... | 713/187 |
| 2009/0249019 A1 * | 10/2009 | Wu et al. | ......................... | 711/171 |
| 2010/0031360 A1 * | 2/2010 | Seshadri et al. | ................ | 726/24 |
| 2010/0049876 A1 * | 2/2010 | Pope et al. | ..................... | 709/250 |
| 2010/0192163 A1 * | 7/2010 | Pope et al. | ..................... | 719/318 |

* cited by examiner

*Primary Examiner* — Alina N. Boutah
(74) *Attorney, Agent, or Firm* — SilverSky Group, LLC

(57) ABSTRACT

Methods and apparatus provide for receiving a request for memory from a network stack subsystem running in user mode. The request is received at a listing of pointers that resides within the network stack but separate from kernel memory. Each available pointer in the listing of pointers references a particular free kernel memory location. In response to the request, the listing of pointers provides the network stack subsystem with at least one pointer to a free kernel memory location. Via the pointer, the network stack subsystem that received the pointer to the free kernel memory location directly writes at least one segment of a packet to the free kernel memory location.

20 Claims, 7 Drawing Sheets

SYSTEM AND METHOD FOR ENABLING NETWORK STACK PROCESSES IN USER MODE AND KERNEL MODE TO ACCESS KERNEL MEMORY LOCATIONS

PRIORITY TO PROVISIONAL APPLICATION

This U.S. Utility Patent Application claims the benefit of the filing date of an earlier filed U.S. Provisional Application for patent having U.S. Ser. No. 60/978,210, filed on Oct. 8, 2007 entitled "High Performance Network Stack." The entire teaching, disclosure and contents of this provisional patent are hereby incorporated by reference herein in their entirety.

BACKGROUND

In conventional network stacks, when an application layer within the network stack initiates creation of a segment of a packet, such as a SIP Invite packet (or any other type of packet), the application layer creates that segment in application user memory. The application layer then executes a socket call to transfer the segment of the packet to another layer in the network stack, such as the network stack's user layer. The network stack's user layer performs a copy operation to copy the segment of the packet from the application layer to the user layer. To transfer the segment of the packet to kernel memory, the user layer executes another copy operation to copy the segment of the packet into kernel memory.

Other layers within the network stack create various packet segments for the invite packet as well. For example, when the user layer creates another packet segment, consisting of packet header data, the user layer initially creates the packet segment in the user layer. Again, the user layer executes a copy operation to transfer the packet segment into kernel memory. As other layers in the network stack create additional packet segments, each packet segment is initially created at a respective layer in kernel memory. In addition, there is another copy to move the fully formed packet into a kernel memory area that is accessible by a hardware device that is responsible for transmitting the packet.

SUMMARY

Conventional network stack environments suffer from a variety of deficiencies in terms of performance. In particular, kernel memory locations in conventional network stacks have protections (i.e. security attributes) that prohibit network stack layers running in user mode from writing directly to kernel memory. Due to such protections, a segment of packet is initially created at a respective layer, as discussed above, rather than being initially created in kernel memory. Thus, when multiple layers in the network stack are each creating segments for multiple packets, the conventional network stack environment experiences vast transactions costs by executing copy operations to transfer each packet segment through the network stack layers to eventually copy each packet into kernel memory.

In addition, conventional network stack environments do not execute a boot time pre-allocation of kernel memory to a particular layer in the network stack. Thus, the actual addresses for kernel memory locations are not available to network stack layers outside of kernel memory. For conventional network stack layers to access various locations in kernel memory, layers within conventional network stack environments rely on a memory mapping of kernel memory locations.

Methods and apparatus described herein provide for a high-performance network stack environment that allows network stack layers to write directly to kernel memory locations by utilizing the actual addresses of kernel memory locations allocated to a user layer of the network stack. Specifically, within the high-performance network stack environment described herein, a request for memory from a network stack subsystem running in user mode is received at a listing of pointers that resides within the network stack but separate from kernel memory. Each available pointer in the listing of pointers references a particular free kernel memory location. In response to the request, the listing of pointers provides the network stack subsystem with at least one pointer to a free kernel memory location. Via the pointer, the network stack subsystem that received the pointer to the free kernel memory location directly writes at least one segment of a packet to the free kernel memory location.

Still other embodiments include a computerized device, configured to process all the method operations disclosed herein as embodiments of the invention. In such embodiments, the computerized device includes a memory system, a processor, communications interface in an interconnection mechanism connecting these components. The memory system is encoded with a process that provide a high-performance network stack environment as explained herein that when performed (e.g. when executing) on the processor, operates as explained herein within the computerized device to perform all of the method embodiments and operations explained herein as embodiments of the invention. Thus any computerized device that performs or is programmed to perform up processing explained herein is an embodiment of the invention.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations providing a high-performance network stack environment as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied strictly as a software program, as software and hardware, or as hardware and/or circuitry alone, such as within a data communications device. The features of the invention, as explained herein, may be employed in data communications devices and/or software systems for such devices.

It is to be understood that the system disclosed herein may be embodied strictly as a software program, as software and hardware, or as hardware alone. The embodiments disclosed herein, may be employed in software and hardware such as those manufactured by Empirix Inc. of Bedford Mass.

Additionally, although each of the different features, techniques, configurations, etc. herein may be discussed in different places of this disclosure, it is intended that each of the concepts can be executed independently of each other or in combination with each other. Accordingly, the present invention can be embodied and viewed in many different ways.

Note also that this Brief Description section herein does not specify every embodiment and/or incrementally novel aspect of the present disclosure or claimed invention. Instead, this Brief Description only provides a preliminary discussion of different embodiments and corresponding points of novelty over conventional techniques. For additional details and/or possible perspectives (permutations) of the invention, the reader is directed to the Detailed Description section and corresponding figures of the present disclosure as further discussed below.

BRIEF DESCRIPTION OF THE DRAWINGS

The foregoing and other objects, features and advantages of the invention will be apparent from the following more particular description of embodiments of the methods and apparatus for a high-performance network stack environment, as illustrated in the accompanying drawings and figures in which like reference characters refer to the same parts throughout the different views. The drawings are not necessarily to scale, with emphasis instead being placed upon illustrating the embodiments, principles and concepts of the methods and apparatus in accordance with the invention.

DETAILED DESCRIPTION

Figure 1:
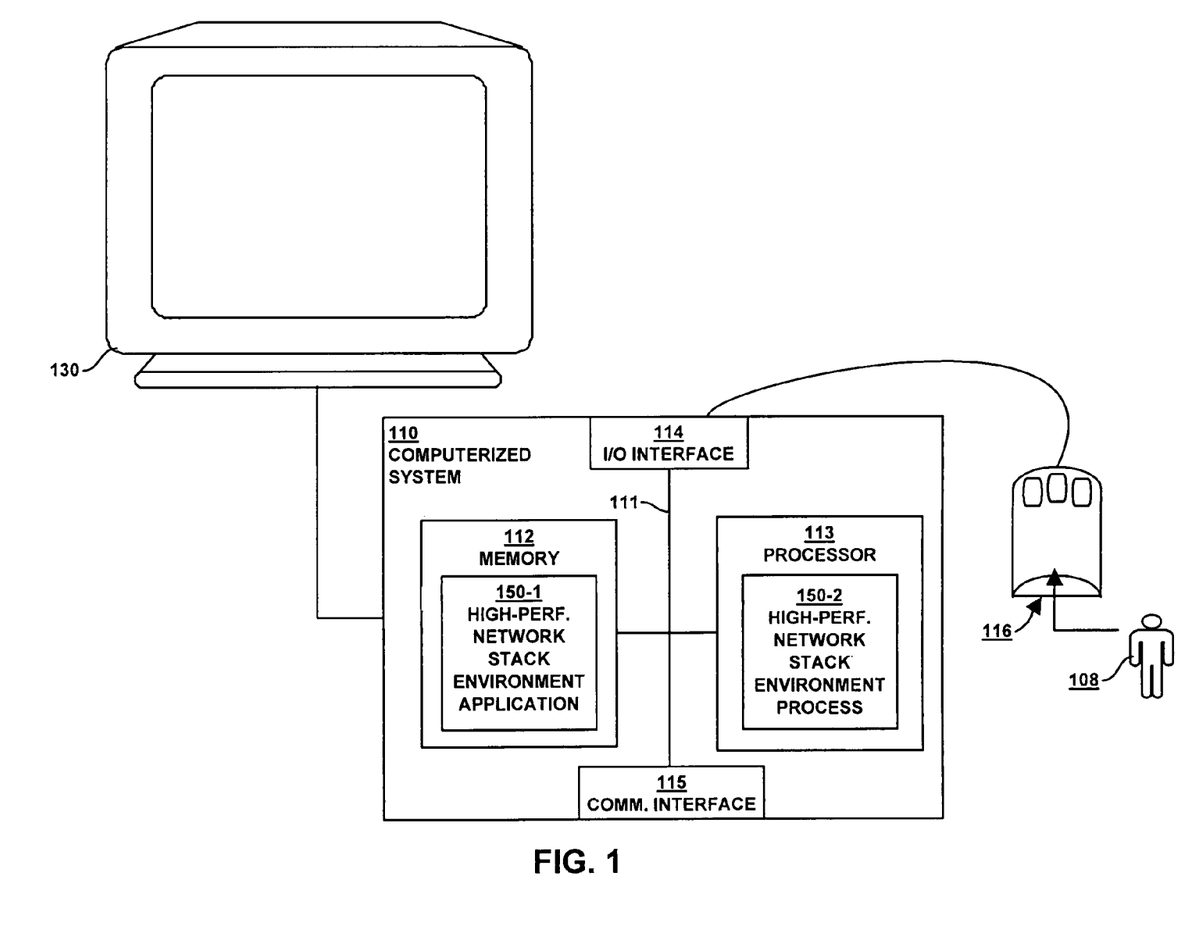
FIG. 1 is an example block diagram illustrating an architecture of a computer system that executes a high-performance network stack environment application and/or a high-performance network stack environment process according to embodiments herein.

FIG. 1 is an example block diagram illustrating an architecture of a computer system 110 that executes, runs, interprets, operates or otherwise performs a high-performance network stack environment application 150-1 and/or high-performance network stack environment process 150-2 (e.g. an executing version of a network stack environment 150 as controlled or configured by user 108) according to embodiments herein.

Note that the computer system 110 may be any type of computerized device such as a personal computer, a client computer system, workstation, portable computing device, console, laptop, network terminal, etc. This list is not exhaustive and is provided as an example of different possible embodiments.

In addition to a single computer embodiment, computer system 110 can include any number of computer systems in a network environment to carry the embodiments as described herein.

As shown in the present example, the computer system 110 includes an interconnection mechanism 111 such as a data bus, motherboard or other circuitry that couples a memory system 112, a processor 113, an input/output interface 114, and a display 130. If so configured, the display can be used to present a graphical user interface of the high-performance network stack environment 150 to user 108. An input device 116 (e.g., one or more user/developer controlled devices such as a keyboard, mouse, touch pad, etc.) couples to the computer system 110 and processor 113 through an input/output (I/O) interface 114. The computer system 110 can be a client system and/or a server system. As mentioned above, depending on the embodiment, the high-performance network stack environment application 150-1 and/or the high-performance network stack environment process 150-2 can be distributed and executed in multiple nodes in a computer network environment or performed locally on a single computer.

During operation of the computer system 110, the processor 113 accesses the memory system 112 via the interconnect 111 in order to launch, run, execute, interpret or otherwise perform the logic instructions of the high-performance network stack environment application 150-1. Execution of the high-performance network stack environment application 150-1 in this manner produces the high-performance network stack environment process 150-2. In other words, the high-performance network stack environment process 150-2 represents one or more portions or runtime instances of the high-performance network stack environment application 150-1 (or the entire application 150-1) performing or executing within or upon the processor 113 in the computerized device 110 at runtime.

The high-performance network stack environment application 150-1 may be stored on a non-transitory computer readable medium (such as a floppy disk), hard disk, electronic, magnetic, optical, or other computer readable medium. It is understood that embodiments and techniques discussed herein are well suited for other applications as well.

Those skilled in the art will understand that the computer system 110 may include other processes and/or software and hardware components, such as an operating system. Display 130 need not be coupled directly to computer system 110. For example, the high-performance network stack environment application 150-1 can be executed on a remotely accessible computerized device via the communication interface 115.

Figure 2:
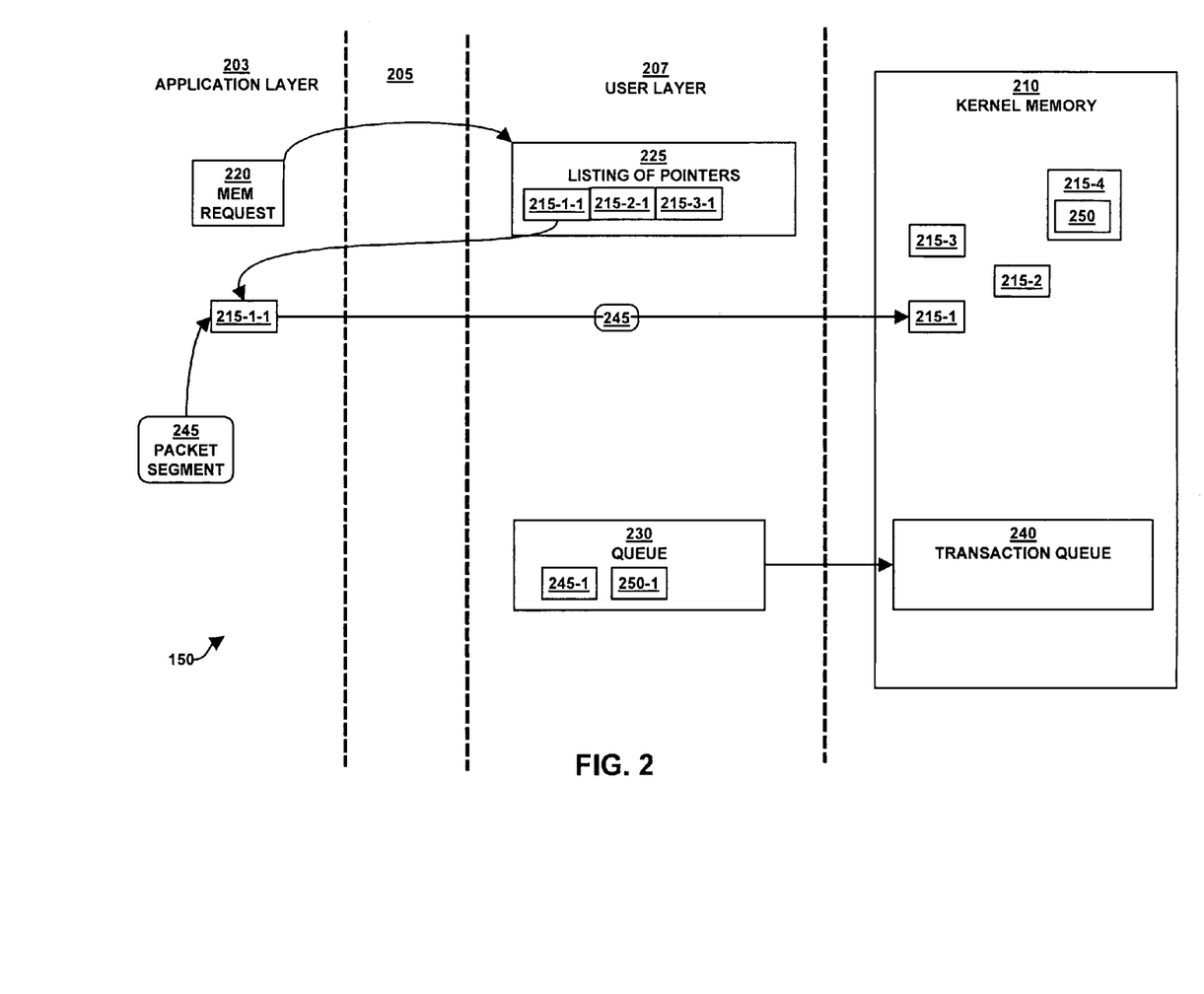
FIG. 2 is an example block diagram of a layer within a high-performance network stack environment writing a segment of a packet to a free kernel memory location according to embodiments herein.
Figure 5:
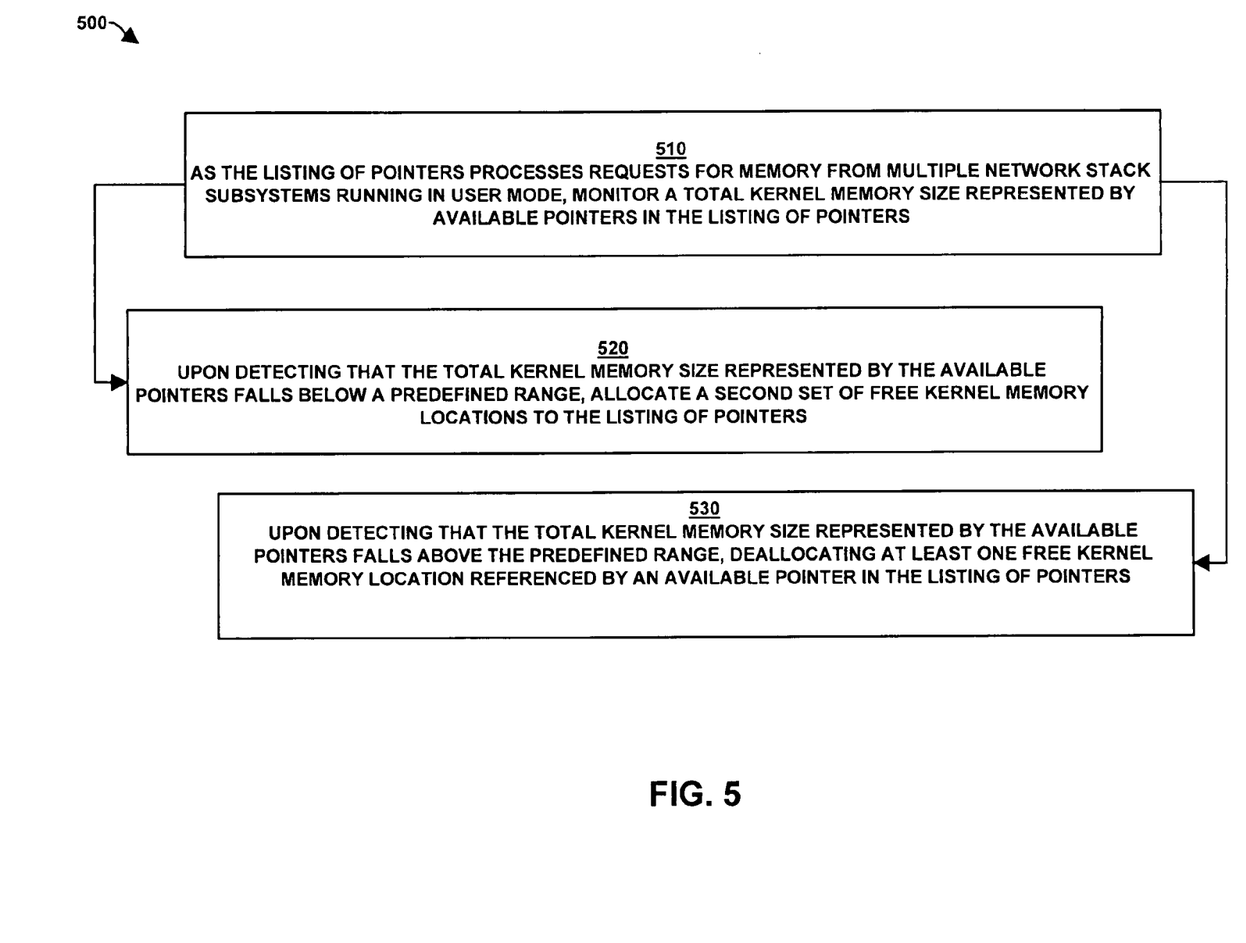
FIG. 5 is a flowchart of an example of processing steps performed by a high-performance network stack environment to monitor a total kernel memory size represented by available pointers in the listing of pointers according to embodiments herein.
Figure 6:
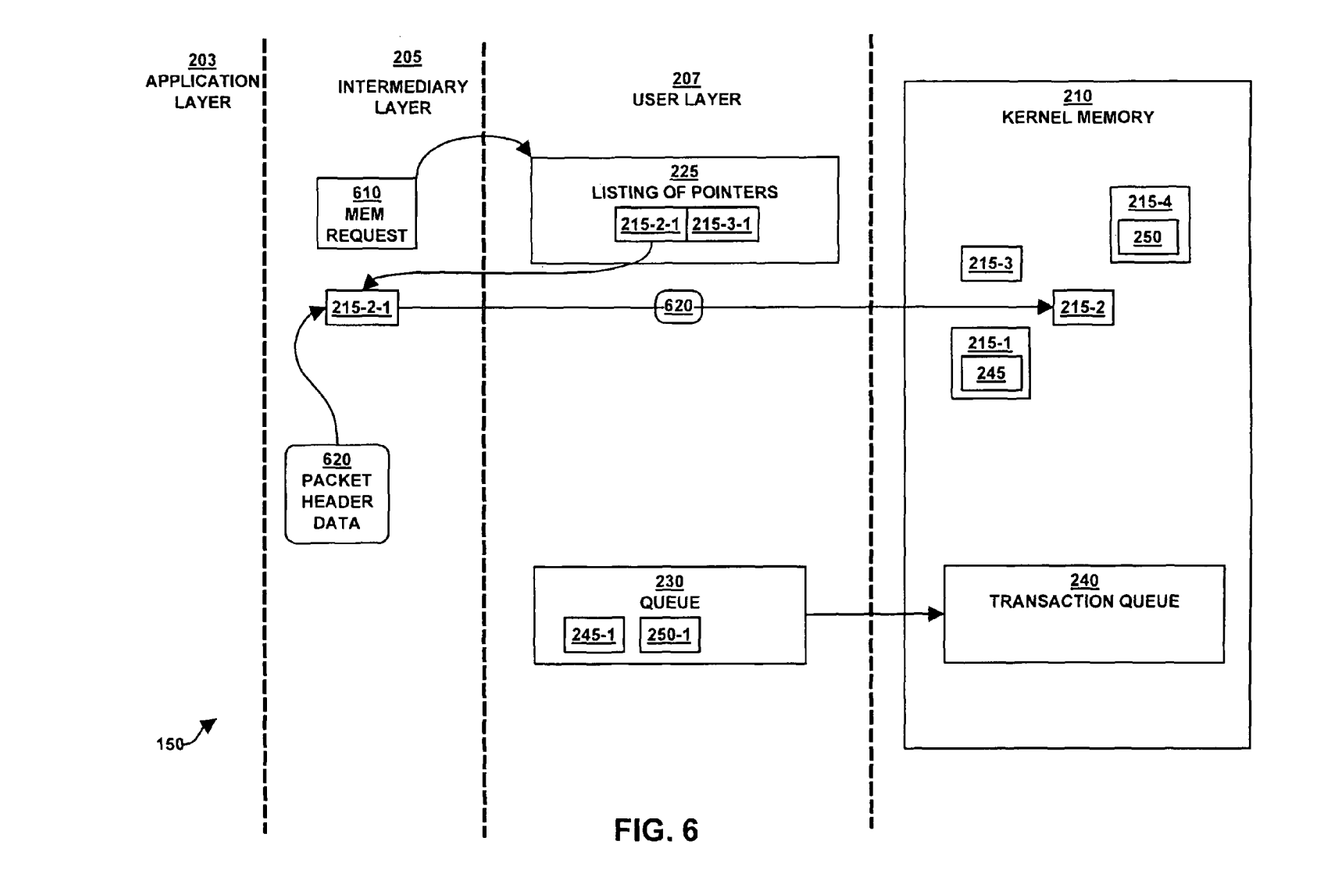
FIG. 6 is an example block diagram of a layer of a network stack within a high-performance network stack environment writing packet header data to a free kernel memory location according to embodiments herein.

FIG. 2 and FIG. 6 illustrate various embodiments of the high-performance network stack environment 150 (hereinafter "network stack environment 150"). FIG. 3, FIG. 4, FIG. 5 and FIG. 7 provide flowcharts 300, 400, 500, 700 describing processing steps performed in the network stack environment 150. The rectangular elements in flowcharts 300, 400, 500, 700 denote "processing blocks" and represent computer software instructions or groups of instructions upon a computer readable medium. Additionally, the processing blocks represent steps performed by hardware such as a computer, digital signal processor circuit, application specific integrated circuit (ASIC), etc.

Flowcharts 300, 400, 500, 700 do not necessarily depict the syntax of any particular programming language. Rather, flowcharts 300, 400, 500, 700 illustrate the functional information one of ordinary skill in the art requires to fabricate circuits or to generate computer software to perform the processing required in accordance with the present invention.

It will be appreciated by those of ordinary skill in the art that unless otherwise indicated herein, the particular sequence of steps described is illustrative only and may be varied without departing from the spirit of the invention. Thus, unless otherwise stated, the steps described below are unordered, meaning that, when possible, the steps may be performed in any convenient or desirable order.

Turning now to FIG. 2, FIG. 2 is an example block diagram of a layer (such as an application layer (203)) within a network stack environment 150 writing a segment of a packet 245 to a free kernel memory location 215-1 according to embodiments herein. Aspects of the network stack environment 150 illustrated in FIG. 2 are referenced below during discussion of FIG. 3, FIG. 4 and FIG. 5.

Figure 3:
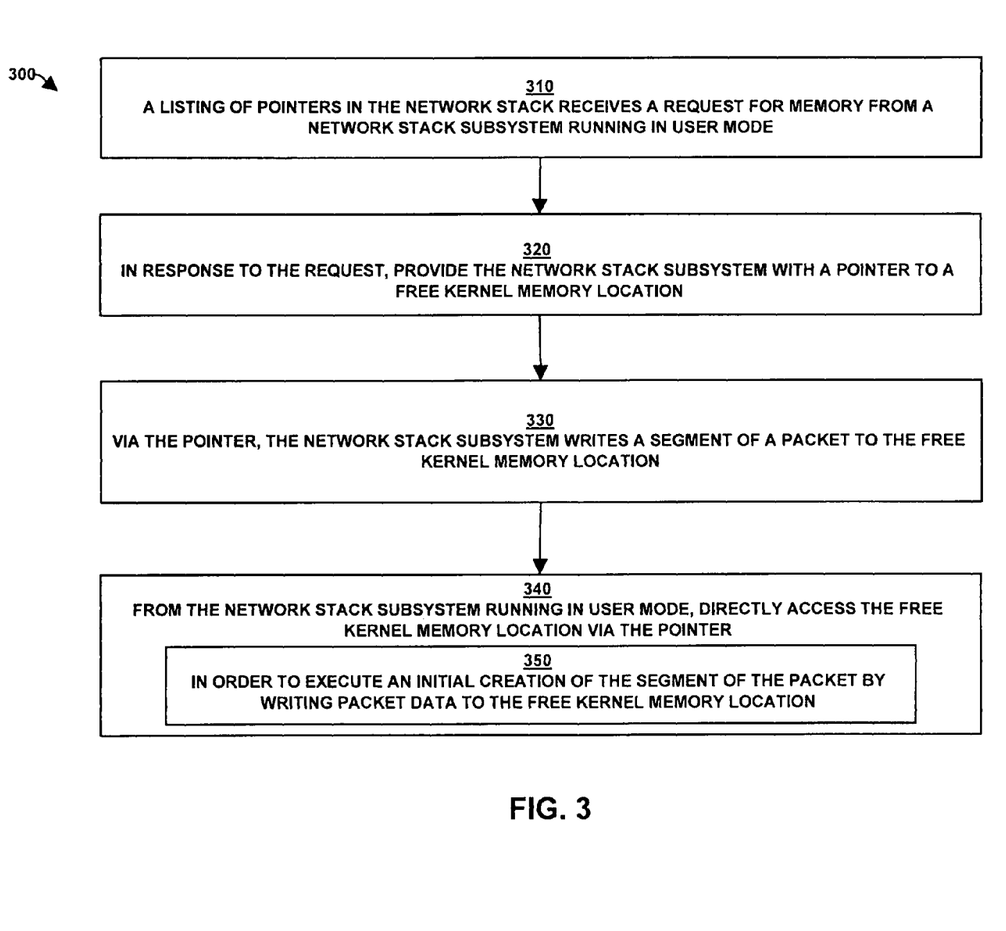
FIG. 3 is a flowchart of an example of processing steps performed within a high-performance network stack environment to write a segment of a packet from a network stack subsystem to a free kernel memory location according to embodiments herein.

FIG. 3 is a flowchart 300 of an example of processing steps performed within a network stack environment 150 to write a segment of a packet from a network stack subsystem to a free kernel memory location according to embodiments herein.

At step 310, a listing of pointers 225 in the network stack environment 150 receives a request for memory 220 from a network stack subsystem running in user mode (such as an application layer 203 of a network stack). The listing of pointers 225 (such as an array of pointers) contains pointers 215-1-1, 215-2-1, 215-3-1 referencing a plurality of currently free kernel memory locations 215-1, 215-2, 215-3. In one embodiment, it is understood that the free kernel memory locations 215-1, 215-2, 215-3 were allocated to the pointers 215-1-1, 215-2-1, 215-3-1 in the listing of pointers 225 during system startup.

At step 320, in response to the request for memory 220, the listing of pointers 225 provides the network stack subsystem (such as the application layer (203) with an available pointer 215-1-1 to a particular free kernel memory location 215-1 in kernel memory 210.

At step 330, via the pointer 215-1-1, the network stack subsystem (such as the application layer 203) writes a segment of a packet 245 (e.g. packet data) to the free kernel memory location 215 that corresponds with the pointer 215-1-1 provided by the listing of pointers 225.

At step 340, from the network stack subsystem running in user mode (such as the application layer 203), the network stack subsystem directly accesses the free kernel memory location 215-1 via the pointer 215-1-1 in order to execute an initial creation of the segment of the packet 245 by writing packet data to the free kernel memory location 215-1 (see step 350).

Thus, in contrast with conventional systems, the first instance (or first version) of the segment of the packet is created directly in kernel memory—as opposed to experiencing the transaction costs of conventional network stack environments that would initially create the segment of the packet at the application layer and then perform multiple copy operations to transfer the segment of the packet to each subsequent layer in a conventional network stack—eventually copying the segment of the packet into kernel memory.

In one embodiment of the network stack environment 150, when the application layer 203 accesses the kernel memory 210 via the pointer 215-1-1 referencing a free kernel memory location 215-1, the application layer 203 performs a write operation by traversing an intermediary layer(s) 205 situated between the network stack subsystem (i.e. the application layer 203) and the kernel memory 210. To create the segment of the packet 245, the application layer 203 writes packet data directly to the free kernel memory location 215-1, which is associated with a security attribute enabling the network stack subsystem (i.e. the application layer 203) to perform at least one of a read operation and a write operation to the free kernel memory location 215-1.

Figure 4:
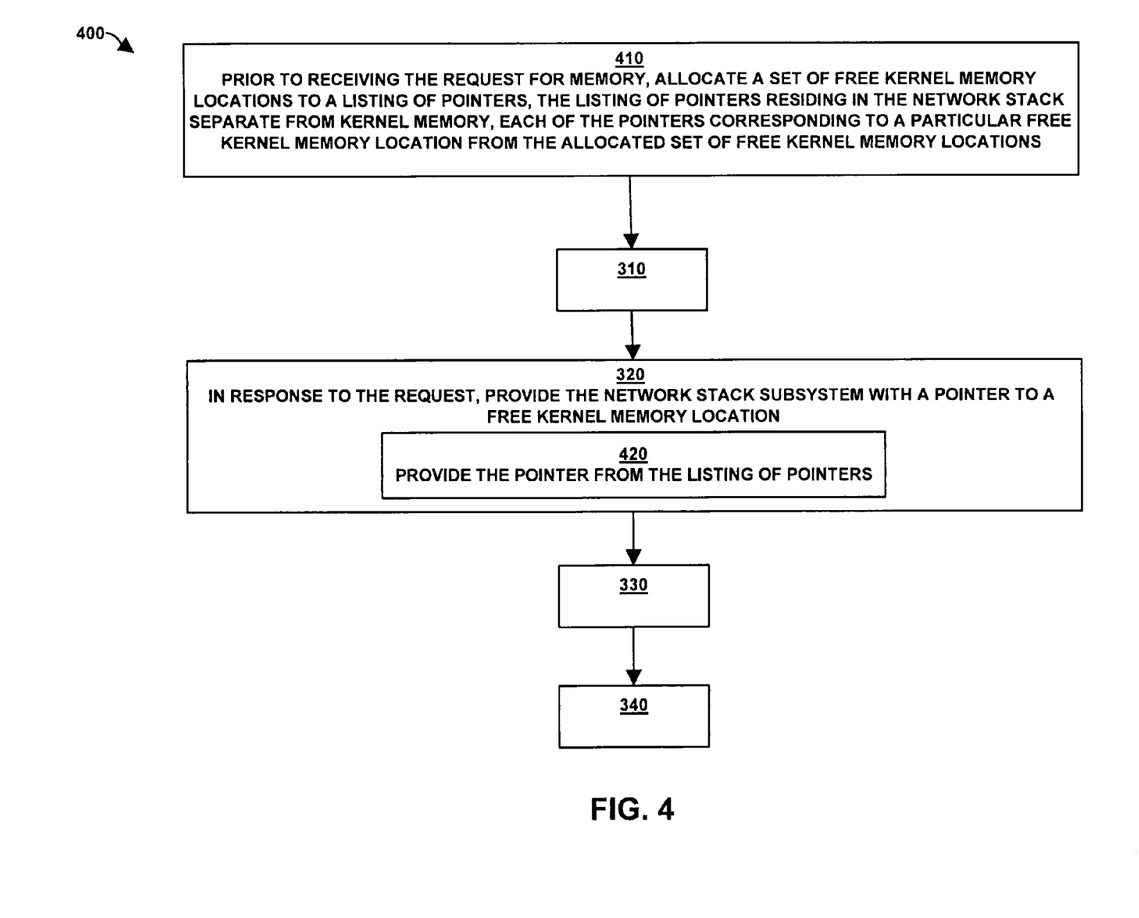
FIG. 4 is a flowchart of an example of processing steps performed by a high-performance network stack environment to create a listing of pointers according to embodiments herein.

FIG. 4 is a flowchart 400 of an example of processing steps performed by a network stack environment 150 to create a listing of pointers according to embodiments herein.

At step 410, prior to receiving the request for memory 220, the network stack environment 150 allocates a set of free kernel memory locations 215-1, 215-2, 215-3 to the listing of pointers 225. It is understood that the listing of pointers 225 resides in a network stack separate from kernel memory 210 and each of the pointers 215-1-1, 215-2-1, 215-3-1 correspond to a particular free kernel memory location 215-1, 215-2, 215-3, respectively. Thus, when the application layer 203 receives the request for memory 220, the network stack environment 150 provides the pointer 215-1 from the listing of pointers 225 (see step 420).

FIG. 5 is a flowchart 500 of an example of processing steps performed by a network stack environment 150 to monitor a total kernel memory size represented by available pointers in the listing of pointers according to embodiments herein.

At step 510, as the listing of pointers 225 processes requests for memory from multiple network stack subsystems running in user mode (such as multiple layers in a network stack), the network stack environment 150 monitors a total kernel memory size represented by available pointers in the listing of pointers 225.

At step 520, upon detecting that the total kernel memory size represented by the available pointers falls below a predefined range, the network stack environment 150 allocates a second set of free kernel memory locations to the listing of pointers 225.

By allocating addresses for a new set of free kernel memory locations to be referenced by new pointers in the listing of pointers 225 when the total amount of kernel memory referenced by available pointers (in the listing of pointers 225) falls below a predefined range, the network stack environment 150 minimizes the number of times the kernel memory 210 has to allocate free kernel memory locations to the listing of pointers 225. As long as the total kernel memory size referenced by the available pointers is within the predefined range, the kernel memory 210 does not have to perform any transactions allocating kernel memory addresses to the listing of pointers 225.

At step 530 upon detecting that the total kernel memory size represented by the available pointers falls above the predefined range, the network stack environment 150 deallocates a free kernel memory location referenced by an available pointer in the listing of pointers.

Thus, the network stack environment 150 detects that the available pointers in the listing of pointers 225 reference a total amount of kernel memory that is greater than the predefined range. Upon detecting such a condition, the network stack environment 150 deallocates free kernel memory addresses (i.e. free kernel memory locations) from being referenced by pointers in the listing of pointers 225. The number of free kernel memory locations that are deallocated can vary so long as there are enough available pointers left in the listing of pointers that reference a total kernel memory size that falls within the predefined range.

In one embodiment, the network stack environment 150 provides for a memory manager in kernel memory 210 that keeps track of kernel memory locations (e.g. memory buffers, free kernel memory addresses) that are currently unused and handles allocation of free kernel memory locations to the listing of pointers 225. Free kernel memory locations tracked by the memory manager can be of a particular size or can be of various sizes.

FIG. 6 is an example block diagram of a layer of a network stack within a network stack environment 150 writing packet header data 620 to a free kernel memory location 215-2 according to embodiments herein. In addition, FIG. 6 illustrates a packet descriptor 245-1 created in response to the application layer 203 writing a segment of a packet 245 directly to a free kernel memory location 215-1.

Upon creation of the segment of the packet 245 (as shown in FIG. 2), the network stack environment 150 created the packet descriptor 245-1, which is associated with the segment of the packet 245 at kernel memory location 215-1, and placed the packet descriptor 245-1 in a queue 230 residing at the user layer 207 of the network stack. Note that the queue 230 can contain multiple packet descriptor.

By way of non-limiting example, as illustrated in FIG. 6, the queue 230 contains a second packet descriptor 250-1 that is associated with a segment of a packet 250 located at kernel memory location 215-4. Additional aspects of the network stack environment 150 illustrated in FIG. 6 are referenced below during discussion of FIG. 7.

Figure 7:
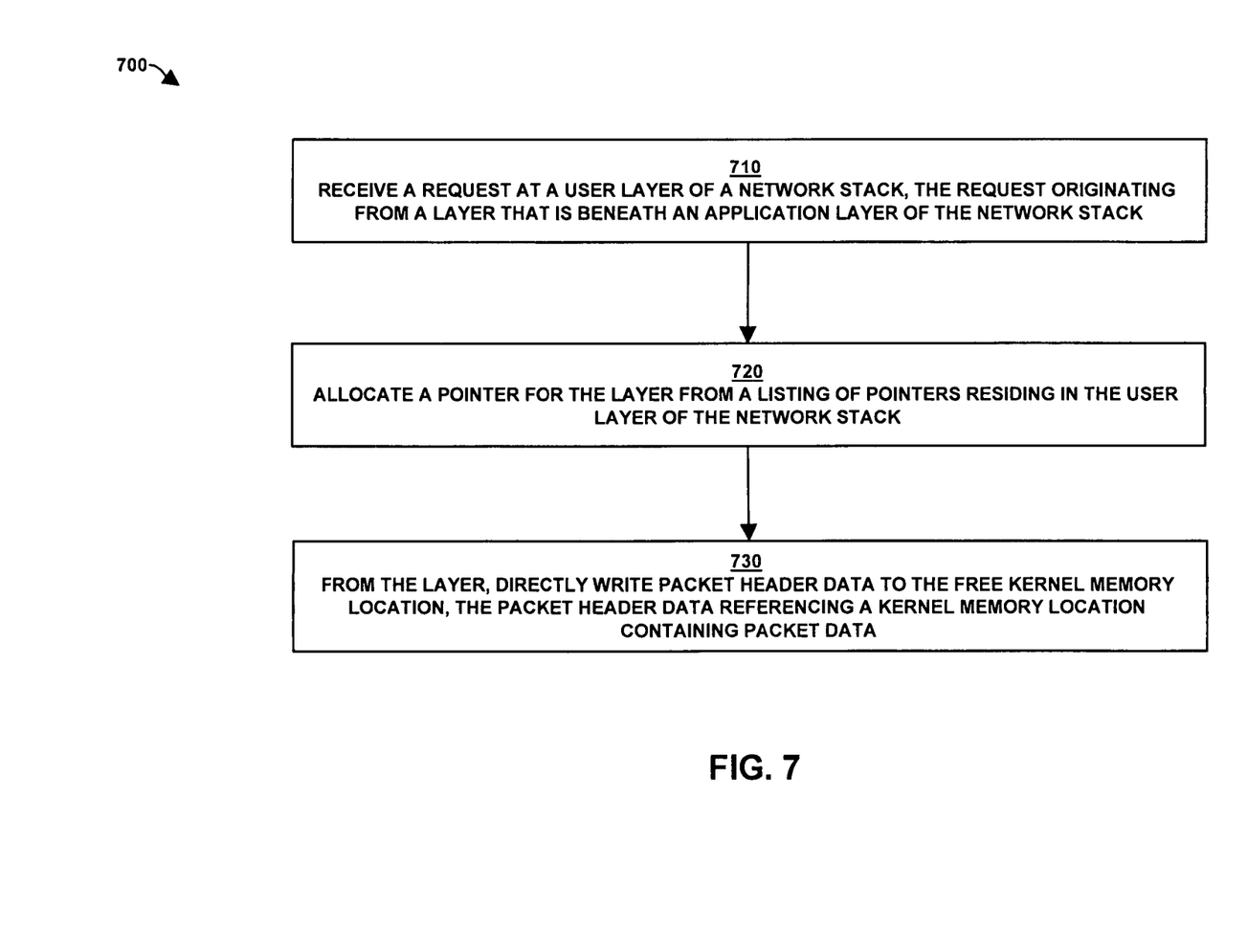
FIG. 7 is a flowchart of an example of processing steps performed within a high-performance network stack environment to write packet header data to a free kernel memory location.

FIG. 7 is a flowchart 700 of an example of processing steps performed within a network stack environment 150 to write packet header data 620 to a free kernel memory location 215-2.

At step 710, a user layer 207 of a network stack in the network stack environment 150 receives a request for memory 610. The request originates from a layer 205 (i.e. an intermediary layer) that is beneath an application layer 203 of the network stack. At step 720, the network stack environment 150 allocates a pointer 215-2-1 for the layer 205 from a listing of pointers 225 residing in the user layer 207 of the network stack.

At step 730, from the layer, directly write packet header data to the free kernel memory location. It is understood that the packet header data referencing a kernel memory location 215-1 containing packet data (such as a segment of a packet 245). In addition, the network stack environment 150 updates the packet descriptor 245-1 to reference the kernel memory location 215-2 that contains the packet header data 620 when the packet header data 620 precedes the segment of a packet 245 according to a packet segment order defined in a network protocol.

Further, with regard to the queue 230 at the user layer 207, the network stack environment 150 determines whether the queue 230 meets a predefined condition in order to transfer all packet descriptors 245-1, 250-1 to a transaction queue 240 in kernel memory 210. The network stack environment 150 determines that the queue 230 meets the predefined condition upon detecting a completion of a predefined interval or upon detecting that a predefined number of packet descriptors are currently held in the queue 230.

Upon determining the queue 230 meets the predefined condition, during a single transaction between the user layer 207 and kernel memory 210, the network stack environment 150 sends each packet descriptor 245-1, 250-1 currently in the queue 230 to a transaction queue 240 in kernel memory 210. In kernel memory 210, the network stack environment 150 transmits each packet associated with each received packet descriptor 245-1, 250-1. In particular, the network stack environment 150 transmits a packet associated with a first packet descriptor 250-1—by transmitting each packet segment in kernel memory associated with the first packet descriptor 250-1. The network stack environment 150 transmits each packet segment associated with the first packet descriptor 250-1 according to a packet segment order. After transmitting each packet segment associated with the first packet descriptor 250-1, the network stack environment 150 transmits each packet segment associated with a second packet descriptor 245-1 from kernel memory.

For example, the network stack environment 150 obtains the first packet descriptor 250-1 received in the transaction queue 240 from the queue 230. The first packet descriptor 250-1 references a first segment of a packet (such as packet header data) at a kernel memory location. The network stack environment 150 accesses the kernel memory location containing the first segment of the packet. The first segment of the packet references a second kernel memory location containing the packet's second segment. The network stack environment 150 transmits the first segment of the packet directly from the kernel memory location. After transmitting the first segment of the packet, the network stack environment 150 accesses the second kernel memory location containing the second segment of the packet.

The second segment of the packet references a third kernel memory location containing the packet's third segment. The network stack environment 150 transmits the second segment of the packet directly from the second kernel memory location and accesses the third memory location. The network stack environment 150 transmits the third segment of the packet directly from the third kernel memory location and continues the process of accessing subsequent packet segments at kernel memory locations identified by preceding packet segments to transmit each packet segment in order until the network stack environment 150 transmits a final packet segment.

In one embodiment, the network stack environment 150 can include a device driver associated with a network stack comprising multiple network stack subsystems (i.e. layers). During initialization, the device driver sends a request for memory. The request for memory is received at a network stack subsystem. A listing of pointers resides in the user layer, where each pointer in the listing of pointers describes actual addresses of free kernel memory locations.

In response to the device driver's request for memory, the network stack subsystem provides the device driver with a pointer from the listing of pointers and the device driver receives the pointer. The device driver receives a packet (which includes packet data). Upon receiving the packet, via the pointer, the device driver writes the received packet directly to the free kernel memory location described by the pointer. The network stack environment 150 creates a packet descriptor that references the kernel memory location of the packet and places the packet descriptor in a transaction queue in kernel memory.

Upon detecting that the transaction queue meets a predefined condition (such as an occurrence of an interval) the high-performance stack environment transfers every packet descriptor currently in the transaction queue to a queue residing at the network subsystem running in user mode (such as the user layer). The network subsystem running in user mode retrieves each packet descriptor from the queue sequentially (i.e. "one-at-a-time"). For each packet associated with a retrieved packet descriptor, the network subsystem running in user mode accesses the packet at the kernel location referenced by and transfers the packet to the network subsystem running in user mode.

It is noted that the methods and systems described herein are not limited to a particular hardware or software configuration, and may find applicability in many computing or processing environments. The methods and systems may be implemented in hardware or software, or a combination of hardware and software. The methods and systems may be implemented in one or more computer programs, where a computer program may be understood to include one or more processor executable instructions. The computer program(s) may execute on one or more programmable processors, and may be stored on one or more storage medium readable by the processor (including volatile and non-volatile memory and/or storage elements), one or more input devices, and/or one or more output devices. The processor thus may access one or more input devices to obtain input data, and may access one or more output devices to communicate output data. The input and/or output devices may include one or more of the following: Random Access Memory (RAM), Redundant Array of Independent Disks (RAID), floppy drive, CD, DVD, magnetic disk, internal hard drive, external hard drive, memory stick, or other storage device capable of being accessed by a processor as provided herein, where such aforementioned examples are not exhaustive, and are for illustration and not limitation.

The computer program(s) may be implemented using one or more high level procedural or object-oriented programming languages to communicate with a computer system; however, the program(s) may be implemented in assembly or machine language, if desired. The language may be compiled or interpreted.

As provided herein, the processor(s) may thus be embedded in one or more devices that may be operated independently or together in a networked environment, where the network may include, for example, a Local Area Network (LAN), wide area network (WAN), and/or may include an intranet and/or the internet and/or another network. The network(s) may be wired or wireless or a combination thereof and may use one or more communications protocols to facilitate communications between the different processors. The processors may be configured for distributed processing and may utilize, in some embodiments, a client-server model as needed. Accordingly, the methods and systems may utilize multiple processors and/or processor devices, and the processor instructions may be divided amongst such single- or multiple-processor/devices.

The device(s) or computer systems that integrate with the processor(s) may include, for example, a personal computer(s), workstation(s) (e.g., Sun, HP), personal digital assistant(s) (PDA(s)), handheld device(s) such as cellular telephone(s), laptop(s), handheld computer(s), or another device(s) capable of being integrated with a processor(s) that may operate as provided herein. Accordingly, the devices provided herein are not exhaustive and are provided for illustration and not limitation.

References to "a processor", or "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application.

References to a network, unless provided otherwise, may include one or more intranets and/or the internet, as well as a virtual network. References herein to microprocessor instructions or microprocessor-executable instructions, in accordance with the above, may be understood to include programmable hardware.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

What is claimed is:

1. A computer-implemented method, comprising the steps of:

allocating a set of free kernel memory locations from a kernel memory to a listing of pointers residing in a user memory, each pointer from the listing of pointers corresponding to a particular free kernel memory location from the set of free kernel memory locations;

setting a security attribute associated with the set of free kernel memory locations that enables a read operation and a write operation by a plurality of user processes running in user mode and a plurality of kernel processes running in kernel mode;

receiving a request for memory from a process among the plurality of user processes, the process associated with a first layer of a network stack;

in response to the request, providing the process with at least one pointer from the listing of pointers to the particular free kernel memory location;

via the at least one pointer, writing at least one segment of a packet to the particular free kernel memory location; and enabling one or more user processes from the plurality of user processes and one or more kernel processes from the plurality of kernel processes to access the at least one segment of the packet via the at least one pointer.

2. The computer-implemented method as in claim 1, wherein the first layer is an application layer, and wherein the step of writing the at least one segment includes the step of writing packet data to the particular free kernel memory location.

3. The computer-implemented method as in claim 2, wherein a second process among the plurality of kernel processes is associated with a second layer beneath the application layer, further comprises the steps of:

receiving a second request for memory from the second process;

in response to the second request, providing the second process with at least one second pointer from the listing of pointers to a second free kernel memory location; and from the second process, directly writing packet header data to the second free kernel memory location via the at least one second pointer, the packet header data referencing the particular free kernel memory location containing packet data.

4. The computer-implemented method as in claim 1, wherein the steps of allocating the set of free kernel memory locations and setting the security attribute associated with the set of free kernel memory locations are performed at a system startup.

5. The computer-implemented method as in claim 1, further comprising the step of:

monitoring a total kernel memory size represented by one or more available pointers in the listing of pointers, comprising the steps of:

upon detecting that the total kernel memory size represented by the one or more available pointers falls below a predefined range, allocating a second set of free kernel memory locations from the kernel memory to a second listing of pointers and adding the second listing of pointers to the listing of pointers, each pointer from the second listing of pointers corresponding to a new free kernel memory location from the second set of free kernel memory locations;

setting a security attribute associated with the second set of free kernel memory locations that enables a read operation and a write operation by the plurality of user processes and the plurality of kernel processes; and upon detecting that the total kernel memory size represented by the one or more available pointers falls above the predefined range, deallocating at least one free kernel memory location referenced by an available pointer in the listing of pointers.

6. The computer-implemented method as in claim 1, wherein the one or more kernel processes are selected from the group consisting of a second process associated with a second layer of the network stack beneath the first layer and a second process associated with a second layer of the network stack above the first layer.

7. The computer-implemented method as in claim 1, further comprising the steps of:

creating a packet descriptor associated with the at least one segment of the packet;

placing the packet descriptor in a first queue residing in the user memory;

determining whether the first queue meets a predefined condition selected from the group consisting of detecting a completion of a predefined interval and detecting a predefined number of packet descriptors currently in the first queue; and upon determining the first queue meets the predefined condition, sending each packet descriptor currently in the first queue to a transaction queue residing in the kernel memory.

8. The computer-implemented method as in claim 7 further comprising the step of for each packet descriptor received by the transaction queue in the kernel memory, transmitting the at least one segment of the packet according to a packet segment order.

9. A computer program product including a non-transitory computer-storage medium having instructions stored thereon for processing data information, such that the instructions, when carried out by a processing device, enable the processing device to perform operations of:

allocating a set of free kernel memory locations from a kernel memory to a listing of pointers residing user memory, each pointer from the listing of pointers corresponding to a particular free kernel memory location from the set of free kernel memory locations;

setting a security attribute associated with the set of free kernel memory locations that enables a read operation and a write operation by a plurality of user processes running in user mode and a plurality of kernel processes running in kernel mode;

receiving a request for memory from a process among the plurality of user processes, the process associated with a first layer of a network stack;

in response to the request, providing the process with at least one pointer from the listing of pointers to the particular free kernel memory location;

via the at least one pointer, writing at least one segment of a packet to the particular free kernel memory location; and enabling one or more user processes from the plurality of user processes and one or more kernel processes from the plurality of kernel processes to access the at least one segment of the packet via the at least one pointer.

10. The computer program product as in claim 9, wherein the first layer is an application layer, and wherein the operation of writing the at least one segment includes the operation of writing packet data to the particular free kernel memory location.

11. The computer program product as in claim 10, wherein a second process among the plurality of kernel processes is associated with a second layer beneath the application layer, further comprising the operations of:

receiving a second request for memory from the second process;

in response to the second request, providing the second process with at least one second pointer from the listing of pointers to a second free kernel memory location; and from the second process, directly writing packet header data to the second free kernel memory location via the at least one second pointer, the packet header data referencing the particular free kernel memory location container packet data.

12. The computer program product as in claim 9, wherein the operations of allocating the set of free kernel memory locations and setting the security attribute associated with the set of free kernel memory locations are performed at a system startup.

13. The computer program product as in claim 9, further comprising the operation of:
  monitoring a total kernel memory size represented by one or more available pointers in the listing of pointers, comprising operations of:
  upon detecting that the total kernel memory size represented by the one or more available pointers falls below a predefined range, allocating a second set of free kernel memory locations from kernel memory to a second listing of pointers and adding the second listing of pointers to the listing of pointers, each pointer from the second listing of pointers corresponding to a new free kernel memory location from the second set of free kernel memory locations;
  setting a security attribute associated with the second set of free kernel memory locations that enables a read operation and a write operation by the plurality of user processes and the plurality of kernel processes; and
  upon detecting that the total kernel memory size represented by the one or more available pointers falls above the predefined range, deallocating at least one free kernel memory location referenced by an available pointer in the listing of pointers.

14. The computer program product as in claim 9, wherein the one or more kernel processes are selected from the group consisting of a second process associated with a second layer of the network stack beneath the first layer and a second process associated with a second layer of the network stack above the first layer.

15. The computer program product as in claim 9, further comprising operations of:
  creating a packet descriptor associated with the at least one segment of the packet;
  placing the packet descriptor in a first queue residing in the user memory;
  determining whether the first queue meets a predefined condition selected from the group consisting of
    detecting a completion of a predefined interval and
    detecting a predefined number of packet descriptors currently in the first queue; and
  upon determining the first queue meets the predefined condition, sending each packet descriptor currently in the first queue to a transaction queue residing in the kernel memory.

16. The computer program product as in claim 15, further comprising the operation
  for each packet descriptor received by the transaction queue residing in the kernel memory
  transmitting the at least one segment of the packet according to a packet segment order.

17. A computer-implemented method, comprising the steps of:
  allocating a set of free kernel memory locations from a kernel memory to a listing of pointers residing in a user memory, each pointer from the listing of pointers corresponding to a particular free kernel memory location from the set of free kernel memory locations;
  setting a security attribute associated with the set of free kernel memory locations that enables a read operation and a write operation by a plurality of user processes running in user mode and a plurality of kernel processes running in kernel mode;
  sending a request for memory from a device driver associated with a network stack;
  receiving the request for memory from the device driver at the listing of pointers;
  providing the device driver with at least one pointer from the listing of pointers, the at least one pointer corresponding to the particular free kernel memory location;
  receiving at least one segment of packet at the device driver;
  via the at least one pointer, writing the at least one segment of the packet directly to the particular free kernel memory location from the device driver;
  creating a packet descriptor referencing the particular free kernel memory location containing the at least one segment of the packet;
  placing the packet descriptor in a first queue residing in the kernel memory;
  transferring the packet descriptor from the first queue to a second queue residing in the user memory, wherein the step of transferring the packet descriptor is performed when the first queue meets a predefined condition;
  in a process among the plurality of user processes and associated with a layer of the network stack, retrieving the packet descriptor from the second queue; and
  from the process, accessing the at least one segment of the packet via the packet descriptor.

18. A computer program product including a non-transitory computer-storage medium having instructions stored thereon for processing data information, such that the instructions, when carried out by a processing device, enable the processing device to perform operations of:
  allocating a set of free kernel memory locations from a kernel memory to a listing of pointers residing in a user memory, each pointer from the listing of pointers corresponding to a particular free kernel memory location from the set of free kernel memory locations;
  setting a security attribute associated with the set of free kernel memory locations that enables a read operation and a write operation by a plurality of user processes running in user mode and a plurality of kernel processes running in kernel mode;
  sending a request for memory from a device driver associated with a network stack;
  receiving the request for memory from the device driver at the listing of pointers;
  providing the device driver with at least one pointer from the listing of pointers, the at least one pointer corresponding to the particular free kernel memory location;
  receiving at least one segment of a packet at the device driver;
  via the at least one pointer, writing the at least one segment of the packet directly to the particular free kernel memory location from the device driver;
  creating a packet descriptor referencing the particular free kernel memory location containing the at least one segment of the packet;
  placing the packet descriptor in a first queue residing in the kernel memory;
  transferring the packet descriptor from the first queue to a second queue residing in the user memory, wherein the operation of transferring the packet descriptor is performed when the first queue meets a predefined condition;
  in a process among the plurality of user processes and associated with a layer of the network stack, retrieving the packet descriptor from the second queue; and
  from the process, accessing the at least one segment of the packet via the packet descriptor.

19. A computer system comprising:

a processor;

a memory unit that stores instructions associated with an application executed by the processor; and an interconnect coupling the processor and the memory unit, enabling the computer system to execute the application and perform operations of:

allocating a set of free kernel memory locations from a kernel memory to a listing of pointers residing in a user memory, each pointer from the listing of pointers corresponding to a particular free kernel memory location from the set of free kernel memory locations;

setting a security attribute associated with the set of free kernel memory locations that enables a read operation and a write opera on by a plurality of user processes running in user mode and a plurality of kernel processes running in kernel mode;

receiving a request for memory from a process among the plurality of user processes, the process associated with a first layer of a network stack;

in response to the request, providing the process with at least one pointer from the listing of pointers to the particular free kernel memory location;

via the at least one pointer, writing at least one segment of a packet to the particular free kernel memory location; and enabling one or more user processes from the plurality of use processes and one or more kernel processes from the plurality of kernel processes to access the at least one segment of the packet via the at least one pointer.

20. A computer system comprising:

a processor;

a memory unit that stores instructions associated with an application executed by the processor; and an interconnect coupling the processor and the memory unit, enabling the computer system to execute the application and perform operations of:

allocating a set of free kernel memory locations from a kernel memory to a listing of pointers residing in a user memory, each pointers from the listing of pointers corresponding to a particular free kernel memory location from the set of free kernel memory locations;

setting a security attribute associated with the set of free kernel memory locations that enables a read operation and a write operation by a plurality of user processes running in user mode and a plurality of kernel processes running in kernel mode;

sending a request for memory from a device driver associated with a network stack;

receiving the request for memory from the device driver at the listing of pointers;

providing the device driver with at least one pointer from the listing of pointers, the at least one pointer corresponding to the particular free kernel memory location;

receiving at least one segment of a packet at the device driver;

via the at least one pointer, writing the at least one segment of the packet directly to the particular free kernel memory location from the device driver;

creating a packet descriptor referencing the particular free kernel memory location containing the at east one segment of the packet;

placing the packet descriptor in a first queue residing in the kernel memory;

transferring the packet descriptor from the first queue to a second queue residing in the user memory, wherein the operation of transferring the packet descriptor is performed when the first queue meets a predefined condition;

in process among the plurality of user processes and associated with a layer of the network stack, retrieving the packet descriptor from the second queue; and from the process, accessing the at least one segment of the packet via the packet descriptor.

* * * * *

UNITED STATES PATENT AND TRADEMARK OFFICE
CERTIFICATE OF CORRECTION

PATENT NO. : 7,937,449 B1  Page 1 of 1
APPLICATION NO. : 12/246742
DATED : May 3, 2011
INVENTOR(S) : Nath et al.

It is certified that error appears in the above-identified patent and that said Letters Patent is hereby corrected as shown below:

In column 12, line 18, in Claim 9, delete "haying" and insert -- having --, therefor.

In column 12, line 23, in Claim 9, after "residing" insert -- in a --.

In column 13, line 49, in Claim 16, after "operation" insert -- of --.

In column 15, line 16, in Claim 19, delete "opera on" and insert -- operation --, therefor.

In column 16, line 23, in Claim 20, delete "east" and insert -- least --, therefor.

In column 16, line 32, in Claim 20, after "in" insert -- a --.

Signed and Sealed this
Eleventh Day of October, 2011

David J. Kappos
*Director of the United States Patent and Trademark Office*